US012499411B2

(12) United States Patent
Yvoz

(10) Patent No.: US 12,499,411 B2
(45) Date of Patent: Dec. 16, 2025

(54) LOCKER BANK SYSTEM FOR ITEM DEPOSIT AND COLLECTION INTEGRATING A TRACING MODULE

(71) Applicant: QUADIENT TECHNOLOGIES FRANCE, Bagneux (FR)

(72) Inventor: Arnaud Yvoz, Taillades (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 55 days.

(21) Appl. No.: 18/424,439

(22) Filed: Jan. 26, 2024

(65) Prior Publication Data
US 2024/0257041 A1 Aug. 1, 2024

(30) Foreign Application Priority Data

Jan. 27, 2023 (EP) .................................. 23153673

(51) Int. Cl.
*G07C 9/27* (2020.01)
*G06Q 10/0836* (2023.01)
*G07C 9/00* (2020.01)
*G07C 9/22* (2020.01)

(52) U.S. Cl.
CPC ..... *G06Q 10/0836* (2013.01); *G07C 9/00309* (2013.01); *G07C 9/00571* (2013.01); *G07C 9/00896* (2013.01); *G07C 9/22* (2020.01); *G07C 9/27* (2020.01); *G07C 2009/0092* (2013.01)

(58) Field of Classification Search
None
See application file for complete search history.

(56) References Cited

U.S. PATENT DOCUMENTS 10,096,183 B2 * 10/2018 Nitu .................... G07C 9/00912
10,672,211 B2 * 6/2020 Flynn ................. G07C 9/00896
10,679,457 B1 * 6/2020 Wu ......................... G06F 21/31
(Continued)

FOREIGN PATENT DOCUMENTS

EP 3 671 665 A1 6/2020

OTHER PUBLICATIONS

Extended European Search Report for EP 23153673 mailed Jul. 17, 2023, 8 pages.

*Primary Examiner* — K. Wong
(74) *Attorney, Agent, or Firm* — Cozen O'Connor

(57) ABSTRACT

A locker bank system for item deposit and collection includes: an electronic locker bank integrating a controller system to manage a compartment equipped with an electronically controlled door to secure temporary storage of items and communicating with a mobile device via a short-distance communication network, and a locker banks server communicating with the mobile device via a long-distance communication network A mobile application integrates a locker development kit, packaging components to allow the mobile device to interact with the electronic locker bank and a tracing module, an event, or an exception and to transfer the same via long-distance communication network to a data tracing server. Logs are continuously collected by the tracing module and are transferred to the data tracing server and chronologically compiled. This compilation is used for analysing problems reported by users or problems identified based on the events reporting or the exceptions reporting.

20 Claims, 5 Drawing Sheets

(56) References Cited

U.S. PATENT DOCUMENTS

| | | | |
|---|---|---|---|
| 11,423,724 B2* | 8/2022 | Gomez Santamaria | ...................... G07C 9/00896 |
| 11,790,709 B2* | 10/2023 | Jiang | ....................... H04W 4/12 340/5.61 |
| 2020/0250614 A1 | 8/2020 | Zhu | |
| 2022/0406113 A1* | 12/2022 | Imanuel | ............. G07C 9/00817 |

* cited by examiner

LOCKER BANK SYSTEM FOR ITEM DEPOSIT AND COLLECTION INTEGRATING A TRACING MODULE

FIELD OF THE INVENTION

The present invention relates to systems and methods for depositing items or shipments into electronic locker banks and for picking-up these items or shipments thereafter by a recipient.

PRIOR ART-BACKGROUND OF THE INVENTION

Electronic locker bank systems are used for dropping-off, storing and picking up various kinds of items. These electronic locker bank systems can be used by carrier agents for depositing shipments, which are then picked-up from the electronic locker bank by recipients or may eventually be collected by a carrier agent for freeing the electronic locker bank for other shipments, if the shipments are not picked up in due time by the recipients. In other applications, electronic locker bank systems can be used by a retailer who deposits in an electronic locker bank on the premises of the retailer store articles purchased by customers either on-line or in the store so that the customers can later pick-up their purchases from the electronic locker bank. A typical architecture for electronic locker bank systems generally comprises a network of electronic locker banks, all communicating directly with a remote lockers management system in charge of managing the network of electronic locker banks, and of also managing data exchanges with information systems of the retailer or of the carrier.

An electronic locker bank is often operated by a user with a man machine interface, such as a touchscreen, embedded in the electronic locker bank, in particular for the opening and closing of compartment doors of the lockers. More conveniently, some electronic locker banks can be operated with a mobile device, such as a personal digital assistant (PDA) or a smartphone, carried by the user of the electronic locker banks as described in patent EP3306577. The mobile device can be used for scanning shipments for reading identification barcodes. Such operation with a mobile device is particularly appropriate for smart autonomous compartments operating without any electrical power connection and relying only on replaceable electrical batteries as described in patent application EP3671665, or in the patent applications EP3671670 or EP3671671 for smart autonomous compartments clusters. For example, in the case of a carrier agent using a mobile device for operating electronic locker banks, the mobile device integrates a logistic application developed and provided by the carrier for managing the shipments delivery and a locker bank application developed and provided by the locker banks provider for operating the locker banks. Electronic locker banks and the locker bank application are designed by the locker bank provider so that they can be used by different carriers. A first issue with these two parallel applications is that two separate installations on each mobile device are required as well as the burden of handling two separate application packages. A second issue is that these two separate applications are not optimally integrated in the mobile device, and for example, a carrier agent would need to start and use the logistic application for managing a shipment delivery and then would need to start and use the locker bank application for operating the locker bank and depositing the shipment. In particular, the logistic application may require a scanning of the shipment for tracking the delivery process and the locker bank application may also require a scanning of the shipment for recognizing which shipment is stored in which compartment. As the two separate applications operate separately and do not communicate, the carrier agent would need to perform two successive scans: a first scan while using the logistic application and then a second scan while using the locker bank application. In the case of a customer of a retailer using a smartphone for picking-up an item for an electronic locker bank, his smartphone integrates a retailer application developed and provided by the retailer and a locker bank application developed and provided by the locker banks provider for operating the electronic locker bank. Electronic locker banks and the locker bank application are designed by the locker bank provider so that they can be used by different retailers as well as by the different carriers. Similar issues as described above would result from having these two parallel applications. In particular, the customer of the retailer would have to specifically download on his smartphone the locker bank application, which could be distributed from public applications stores. This additional download complexifies the customer journey and would need to be avoided.

While integrating the locker bank application within the logistic application or within the retailer application can solves the issues described above, such integration is the source of difficulties both for the locker bank application provider and the logistic application service provider or the retailer application service provider. In particular, in the case of the locker bank application, it has to be integrated by the service provider within its application. Each service provider may integrate differently the locker bank application depending on his business or administrative processes and may change and adapt his integration with time. As a result, the locker bank application provider loses control on the way the locker bank application is used, potentially creating operation errors and difficulties in diagnosing the errors.

SUMMARY OF THE EMBODIMENTS OF THE INVENTION

It is an object of the present invention to substantially overcome or ameliorate at least one or more of the above disadvantages. To this end, the invention provides a locker bank system for an item deposit and collection comprising: an electronic locker bank integrating a controller system configured to manage a compartment equipped with an electronically controlled door for securing a temporary storage of the item and communicating with a mobile device via a short-distance communication network, and a locker banks server communicating with the mobile device via a long-distance communication network, characterized in that the mobile device comprises a mobile application integrating a locker development kit packaging required components for allowing for the electronic locker bank to interact with and be operated by the mobile device and a tracing module configured for capturing logs, an event, or an exception and for transferring the logs, the event or the exception via a long-distance communication network to a data tracing server in order to better understand processes of a service provider owning the mobile device and application and to be able to perform error analysis regarding interactions with the electronic locker bank. Data are stored and accessed by the locker banks provider for analysis or for reporting, and a partial access to the data tracing server is provided to a service provider for some data relevant for the service provider.

Logs are continuously collected by the tracing module and are transferred to the data tracing server and chronologically compiled. This compilation is used for analysing problems reported by users or problems identified based on the events reporting or the exceptions reporting.

According to a feature of the invention, the tracing module comprises an event module configured for collecting the event generated as defined by the locker banks provider and for storing the event temporarily in a volatile memory of the tracing module and for transferring the event to the data tracing server via the long-distance communication network.

According to another feature of the invention, the event comprises parametric data characterizing the event including a date and hour of the event or a result of the event or a result code or a duration of an action corresponding to the event or unique identifications of sessions when the event takes place.

In a preferred embodiment, the identifications of sessions comprise an application session identification generated when the mobile application loads the locker development kit in an active memory of the mobile device or a development kit session identification generated when the mobile application performs a login or a server session identification generated for each communication exchange between the mobile application and the locker banks server. The session identifications allow for a more efficient tracing of the operations related to the locker development kit.

In a particular embodiment, the tracing module comprises an exception module configured for collecting the exception generated when an unexpected error or behavior occurs and for storing the exception temporarily in the volatile memory of the tracing module and for transferring the exception to the data tracing server via the long-distance communication network.

In another embodiment, the exception includes a tracing thread listing a succession of actions associated the exception and an exception naming related to a latest of the succession of actions.

One particular advantage of the invention is that the tracing module comprises a logs capture module configured for collecting the logs generated as defined by the locker banks provider and for storing the logs chronologically with an associated time and date in a logs repository included in a non-volatile locker development kit memory and for transferring the logs to the data tracing server via the long-distance communication network.

Advantageously, the logs include logs transmitted from the mobile application to the locker development kit if so desired by or so agreed with the service provider.

Another object of the invention is that the logs are formatted into successive unitary files constituted of a pre-defined number of bytes comprised in a configuration package stored in a memory included in or associated with the locker development kit.

Preferably, pre-defined number of bytes equals 512 k.

As logs may cover all details of code execution related to electronic, mechanisms for limiting logs production are required for preserving memory usage and communication bandwidth for transferring logs to the data tracing server. Another subject matter of the invention proposes that a number of the unitary files stored in the logs repository is limited to a maximum number stored in the configuration package.

Preferably, the maximum number equals 420.

According to a feature of the invention, the logs capture module is configured for selecting the logs according to a logging level stored in the configuration package. Adjusting the setting of the logging level allows for adjusting the flow of logs captured by the logs capture module and the associated the duration of logs capturing stored in the log repository.

As opposed to events and exceptions, which are transferred in real time to the data tracing server, logs are continuously collected within the mobile device but their transfer to the data tracing server is delayed until triggered according to either of the processes of logs on demand or auto-logs. According to another feature of the invention, the tracing module comprises a logs on demand module configured for being activated by a user of the mobile device and for packaging into a file the logs stored in the logs repository with a reference information and for transferring the file to the data tracing server via the long-distance communication network.

In a preferred embodiment, the reference information includes a name of the file or a unique ID identifying the file or a date and hour or a version of the locker development kit or a unique identification of the mobile device.

In a particular embodiment, the tracing module comprises an auto-logs module configured for an occurrence of an event or of an exception to trigger a retrieving of a number SendLogsNbLogs of latest the unitary files stored in the logs repository and a transferring of the retrieved latest unitary files to the data tracing server via the long-distance communication network. Such automated regular preparations of selected logs for transfer to the data tracing server is performed by the auto-logs module for not depending only on voluntary manual actions of users for receiving logs in the data tracing server and for ensuring for a minimum volume of logs continuously collected from all mobile devices.

One particular advantage of the invention is that the triggering event is comprised in an Events List stored in the configuration package and the triggering is comprised in an Exceptions List stored in the configuration package in order to limit the number of auto-logs transferred to the data tracing server, and therefore not overloading the controller of the mobile device.

Advantageously, the SendLogsNbLogs is stored in the configuration package and is used for limiting the size of the auto-logs file sent to the data tracing server.

According to a feature of the invention, the configuration package is downloaded from the locker banks provider onto the mobile device, therefore, allowing for a customization and updating of the configuration package parameters depending on the usage of the locker development kit.

According to another feature of the invention, the data tracing server comprises an events structured memory for storing events transferred by the event module and an exceptions structured memory for storing events transferred by the exception module and a logs on demand repository for storing logs transferred by the logs on demand module and an auto-logs repository for storing logs transferred by the auto-logs module.

In a preferred embodiment, the logs on demand repository or the auto-logs repository is configured for storing chronologically unitary files transferred from the tracing module.

In a particular embodiment, the unitary files stored in the logs on demand repository or in the auto-logs repository are regularly suppressed for freeing memory space in the data tracing server.

In another embodiment, the logs on demand repository and the auto-logs repository are part of a common repository.

Preferably, the locker bank system further comprises a Locker Bank Toolbox including a high-level methods pack configured to be called by the mobile application and including the tracing module.

Advantageously, the locker development kit is configured to be called by high-level methods of the high-level methods pack for allowing interaction with the electronic locker bank.

The invention also concerns a method for operating the locker bank system including, when a process of the user mobile application requires an interaction with the electronic locker bank or an interaction related to the electronic locker bank: initiating an electronic locker bank related interaction corresponding to a series of actions performed by the locker development kit, and for each action within the series of actions: generating logs associated with the action and including a description related to the each action and time and date of the each action, storing the log in a logs repository, and if the action requires an event to be generated: generating an event related to the action and including parametric data characterizing the event, packaging the event for being communicated to the data tracing server and transferring the event to the data tracing server, and if the action requires an exception to be generated: generating an exception related to the action and including a description characterizing the exception and a code for the exception, and packaging the exception for being communicated to the data tracing server and transferring the event to the data tracing server.

In a first aspect of the method, the generating a log and the storing the log occur if the action requires a log to be generated based on a logging level.

According to a feature of the invention, the storing the log in a logs repository further comprises reaching a maximum number of unitary files stored in the logs repository, and overwriting oldest unitary files stored in the logs repository with unitary files of the logs.

According to another feature of the invention, the event is checked as included in an Events List and the transferring the event further comprises: retrieving a first number SendLogsNbLogs of latest unitary files stored in the logs repository, packaging the first number SendLogsNbLogs of latest unitary files with an identification and a description of the event into a first transferable package, and transferring the first transferable package to the data tracing server.

In a preferred embodiment, the exception is checked as included in an Exceptions List and the transferring the exception further comprises: retrieving a second number SendLogsNbLogs of latest unitary files stored in the logs repository, packaging the second number SendLogsNbLogs of latest unitary files with the code of the exception and the description characterizing the exception into a second transferable package, and transferring the second transferable package to the data tracing server.

The invention also concerns another method for operating the locker bank system, when a user is requested to upload logs to the data tracing server for analysing any particular issue regarding an interaction with the electronic locker bank and with the mobile device, including: initiating a logs on demand process, retrieving all logs from the logs repository, transferring the all logs from the mobile device to the data tracing server, and storing the all logs in the data tracing server.

In a particular embodiment, the initiating a logs on demand process is performed by selecting a function on an interface of the mobile device.

BRIEF DESCRIPTION OF THE DRAWINGS

Other aspects, features, and advantages of the teachings of the invention will become clearer to those ordinary skilled in the art upon review of the following description in conjunction with the accompanying drawings where.

DETAILED DESCRIPTION

Figure 1:
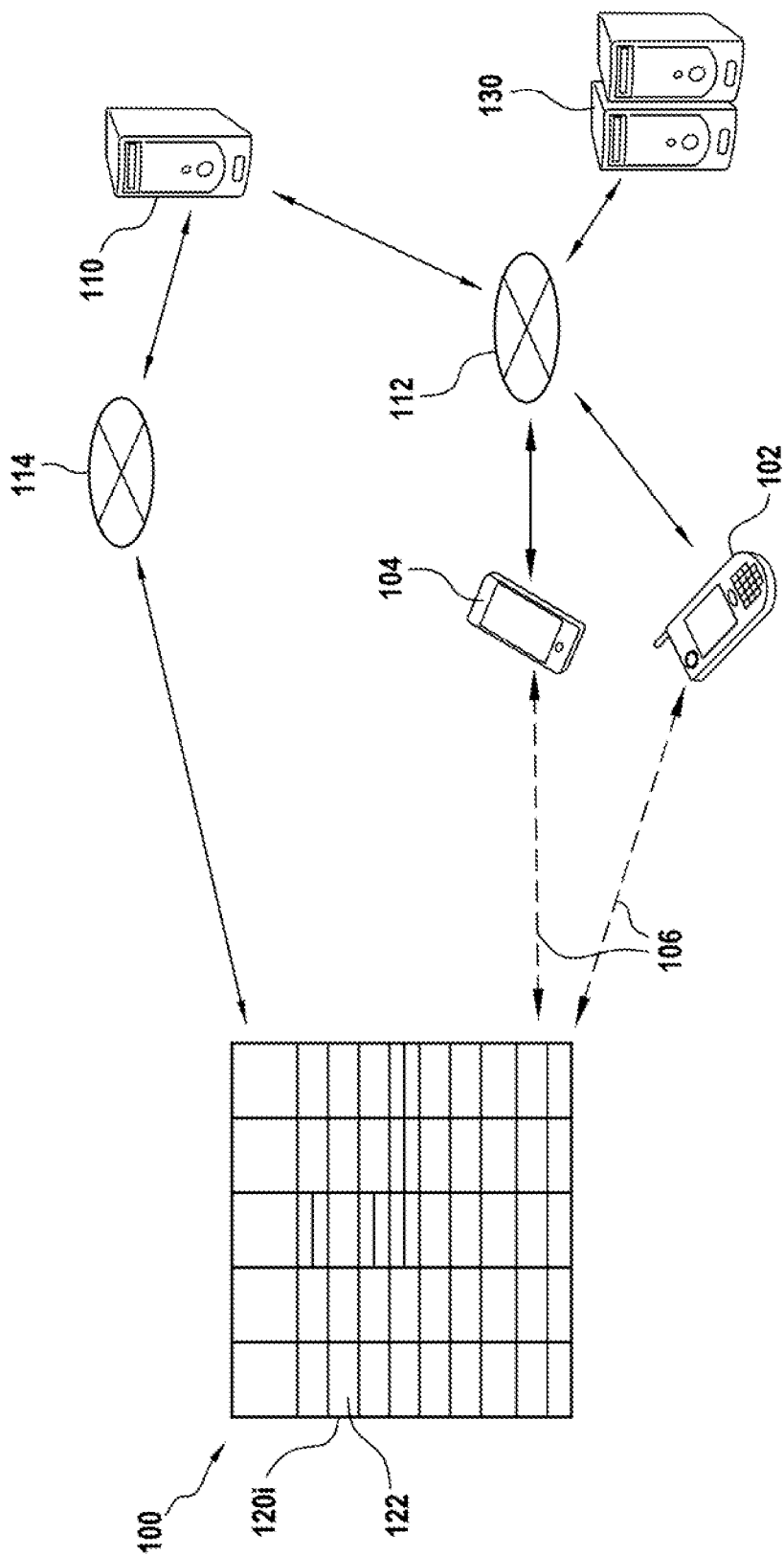
FIG. 1 illustrates a locker bank system embodying the present invention.

FIG. 1 illustrates an embodiment of a locker bank system comprising an electronic locker bank 100 communicating with a user mobile device 102 or 104 via a wireless short-distance local communication network 106, and a remote Locker banks server 110, which manages authorization access to the electronic locker bank and data regarding the shipments handled by the electronic locker bank. The Locker banks server communicates with the user mobile device 102 or 104 via a long-distance communication network 112 based on a technology such as 3G-5G GSM. Data exchange between the electronic locker bank and the Locker banks server is performed via a long-distance communication network 114, which can be the same as the long-distance communication network 112. The Locker banks server can manage a network of electronic locker banks and can centralize data for the whole network of electronic locker banks. The electronic locker bank comprises a series of compartments 120i of different sizes and with each compartment equipped with an electronically controlled door 122i. The electronic locker bank can be used by a carrier for depositing shipments, which are then picked-up by recipients of these shipments, or can be used by a retailer for depositing articles purchased by their customers. Shipment deposit may take place in public outdoor or indoor locations, on the premises of various businesses or in apartment buildings or private communities. Retailers correspond to the various consumer goods vendors including sport or home improvement goods or pharmacies. Information systems 130 of the carrier or of the retailer communicate with the Locker banks server for managing shipments and articles delivery and collection via a long-distance communication network, which can be the same as the long-distance communication network 112. The Locker banks server can centralize data regarding the shipments handled by multiple electronic locker banks used by different retailers or carriers. The electronic locker bank can be operated for depositing retail articles or shipments with the mobile device 102, such as a personal digital assistant or a smartphone, carried by a retailer agent or a carrier agent. The electronic locker bank can also be operated for picking-up retail articles or shipments with the mobile device 104, such as a smartphone, carried by a retailer customer or a shipment recipient. The information systems 130 of the carrier or of the retailer communicate with the mobile device 102 of the retailer agent or of the carrier agent and with the mobile device 104 of the retailer customer or of the shipment recipient via a long-distance communication network, which can be the same as the long-distance communication network 112.

In a particular embodiment, there is no direct long-distance communication connection between the electronic locker bank and the remote Locker banks server, and no data is directly exchanged via any long-distance communication network between the electronic locker bank and the remote Locker banks server. Data exchange between the electronic locker bank and the remote Locker banks server is performed via the mobile device 102 of the retailer agent or of the carrier agent, or via the mobile device 104 of the retailer customer or of the shipment recipient.

The electronic locker bank operation, and in particular the opening and closing of the compartment doors, can be controlled by a central control unit, which also controls the communication with the user mobile devices. In a preferred embodiment, each compartment can be controlled by a dedicated locking module, which also controls the communication with the user mobile devices. In another embodiment, the electronic locker bank includes several cluster locking modules, where each cluster locking module controls several compartments grouped into a compartment cluster and enables the communication with the user mobile devices.

Figure 2:
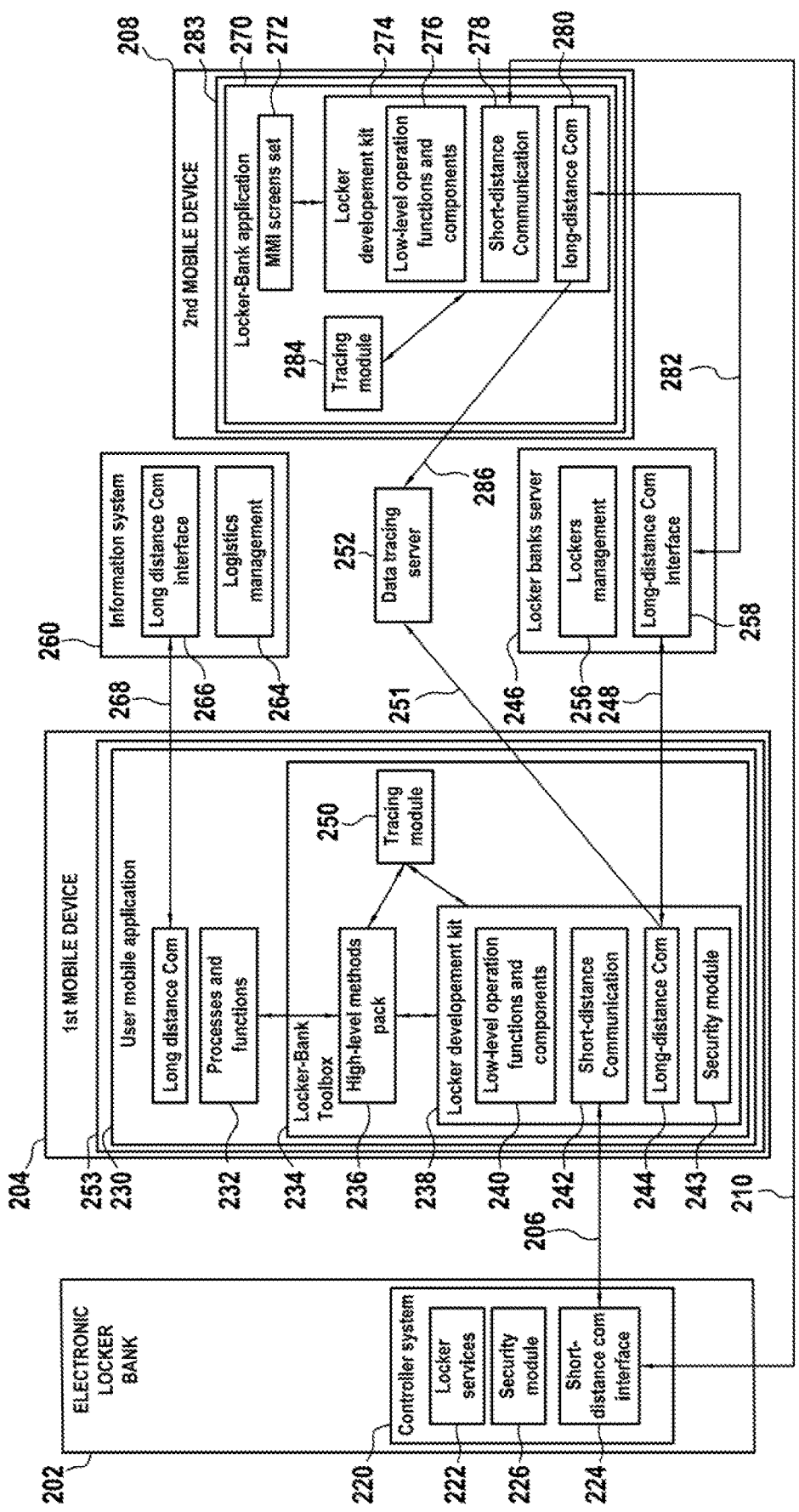
FIG. 2 illustrates a locker bank system integrating a tracing module and a data tracing server of the invention.

FIG. 2 illustrates an embodiment of a locker bank system of the invention comprising an electronic locker bank 202 communicating with a first mobile device 204 via a short-distance communication network 206, such as wireless local network WIFI or Bluetooth, and communicating with a second mobile device 208 via a short-distance communication network 210. The electronic locker bank comprises a controller system 220 including locker services 222 for managing a compartment equipped with an electronically controlled door and provided for handling shipments or retailer articles. The controller system also includes a short-distance communication interface 224 for communicating with mobile devices of users of the electronic locker bank localized near the electronic locker bank. Preferably, requests from the first mobile device to the electronic locker bank can be decrypted by a security module 226, and responses from the electronic locker bank to first mobile device can be encrypted by the security module 226. The controller system can be a centralized system operating the whole electronic locker bank and in particular performing the opening and closing of all the compartment doors of the electronic locker bank. In a preferred embodiment, the electronic locker bank comprises several controller systems, each being dedicated to a compartment or to a compartments cluster grouping a few compartments together.

The first mobile device 204 can be used for interacting with the electronic locker bank as part of a more general commercial service offered by a service provider such as a tracking and delivering of shipments by a carrier agent or a management of orders for a customer of a retailer. A user mobile application 230 is installed and runs on the first mobile device for providing the user with the commercial service. The user mobile application may have been installed before the first mobile device being provided to the user or may have been downloaded from an app store. The commercial service is carried out by user processes and functions 232 included in the user mobile application, and which are made available to the user via the man machine interface of the first mobile device. A Locker Bank Toolbox 234 is integrated in the user mobile application and allows for the user of the first mobile device to interact with the electronic locker bank. The locker bank toolbox comprises a high-level methods pack 236 including high-level methods, which can be called by the user processes and functions of the user mobile application when interaction with the electronic locker bank is required. This high-level methods pack is a necessary functional block for a user of the electronic locker bank to interact with the electronic locker bank.

The locker bank toolbox of the invention provides multiple benefits. As the service provider can integrate the locker bank toolbox into his user mobile application, there is no handling of two separate application packages (for the user mobile application and the locker bank application) and only one application installation is required. For the user, interacting with the electronic locker bank is a seamless experience as the locker bank toolbox is fully integrated in the user mobile application and the user has to login only in the user mobile application. Additionally, providing a set of high-level methods allows the service provider to adapt and optimize the interaction with the electronic locker bank according to his own processes and allows him to develop his specific eco-system. The high-level methods call low-level components for operating the electronic locker bank included in a Locker development kit 238 comprising low-level operation functions and components 240 such as functions for opening compartment doors or for managing data regarding shipments/articles or compartments status or components for reading door status or lock status. The high-level methods are public and can be directly called by the user mobile application. The low-level components of the Locker development kit are private and cannot be directly called by the user mobile application. The Locker development kit also comprises a short-distance communication module 242 for the first mobile device to communicate wirelessly with the electronic locker bank via the short-distance communication network 206. In a preferred embodiment, requests from the Locker development kit to the electronic locker bank are encrypted for local security by a security module 243 and decrypted by the security module 226 of the electronic locker bank, and responses from the electronic locker bank to the Locker development kit also are encrypted by the security module 226 and then decrypted by the security module 243. Additionally, the Locker development kit comprises a long-distance communication module 244 for the first mobile device to communicate with a remote Locker banks server 246 via the long-distance communication network 248. The locker bank toolbox is generally developed and provided by a locker banks provider with a network of electronic locker banks and the remote Locker banks server. The locker bank toolbox constitutes a complete package grouping all required components for allowing for the first mobile device to interact with the electronic locker bank via the high-level methods, which connect with the low-level components of the Locker development kit. The locker bank toolbox can easily be integrated into the user mobile application without impacting the user mobile application operation other than adding the capability for interacting with the electronic locker bank. Also, the locker bank toolbox can easily be removed from the user mobile application without impacting the user mobile application operation other than removing the capability for interacting with the electronic locker bank. The locker bank toolbox is designed for integration in the user mobile application of any carrier or of any retailer.

The providing of this set of high-level methods is a valuable advantage for the service provider who can adapt and optimize the interaction with the electronic locker bank according to his own processes and it allows the service provider to develop his specific eco-system. On the other hand, this freedom for the service provider to integrate the electronic locker bank operation within its own application and processes can become an issue and a true challenge for the locker banks provider as he loses control and knowledge of this integration. The code developed by the service provider for the processes and functions 232, which covers in particular the processes of interaction with the electronic locker bank, is not under the control of and eventually not known by the locker banks provider. Neither is the management of the errors, which is controlled by the user mobile application 230 developed by the service provider. In case of error during an interaction with the electronic locker bank via the user mobile application, the locker banks provider may have difficulties to perform a timely diagnostic and eventually an efficient maintenance of the Locker Bank Toolbox.

The integration of a tracing module 250 within the Locker Bank Toolbox is therefore most beneficial for capturing logs and other information to better understand the service provider processes and to be able to perform error analysis. The tracing module can be part of the locker development kit 238 or can be a parallel module operating with the locker development kit and the high-level methods pack. The purpose of the tracing module is to collect appropriate data and transfer them via a long-distance communication network 251, which may be the same as the long-distance communication network 248, to a data tracing server 252, where the data can be stored and accessed by the locker banks provider for analysis or for reporting. Also, partial access to the data tracing server can be provided to a service provider for some data relevant for the service provider. Preferably, the data tracing server and the locker banks server 246 are different and separate, and they provide specific and different services. The locker banks server manages a national or a regional park of electronic locker banks and manages logistics data—on one hand providing authorization accesses and shipments information to the electronic locker banks and on the other hand receiving from the electronic locker banks nominal events reporting normal operation of the electronic locker banks. The data tracing server only collects from all electronic locker banks worldwide a broad scope of information, which relate to potential errors such as exceptions, selected auto-logs or log on demand. This worldwide collection allows for a worldwide reporting of errors and a worldwide analysis of errors, allowing for providing a worldwide information to global service providers. Three types of data are collected by the tracing module: events, exceptions, and logs. Events are defined by the locker banks provider and relate to the operation and usage of the electronic locker bank. For example, an event is generated each time a high-level method is called, or an event is generated for a process error such as when a door compartment is not closed after a pick-up or after a deposit. Events can also be collected for the benefit of a service provider for example for monitoring the duration of a parcel deposit or the duration of a login for interacting with the electronic locker bank for agents of a service provider. Events stored in a structured memory such as a database, can be used for statistical analysis and for reporting allowing for better understanding usages or process errors, and eventually for responding to information needs of service providers. For example, reports on the types of mobile devices used for interacting with the electronic locker banks or on the operating systems used by the mobiles devices can motivate for how much of resources is to be allocated for support and development regarding particular mobile devices or operating systems. Exceptions correspond to unexpected errors or behaviours and are collected for analysis and for correcting the source of problems, and for preventing potential crashes. Typical exceptions are triggered by issues with the long-distance communication networks or with the short-distance communication network. Exceptions are stored in a structured memory such as a database and are used for monitoring problems and for reporting on those problems. Logs are continuously collected by the tracing module and are transferred to the data tracing server and chronologically compiled. This compilation is used for analysing problems reported by users or problems identified based on the events reporting or the exceptions reporting.

The Locker banks server 246 includes a locker banks management module 256 for managing the electronic locker bank 202 as well as for managing a network of electronic locker banks and for centralizing data for the whole network of electronic locker banks. The Locker banks server includes a long-distance communication interface 258 for electronic data exchange with the first mobile device via the long-distance communication network 248. This communication channel is used for requests from the low-level operation functions and components 240 such as for authenticating a user of the first mobile device, which is performed by the Locker banks server, or for reporting locker events to the Locker banks server by low-level operation components 240 following on interactions of the low-level operation components with locker services of the electronic locker bank via the short-distance communication network 206. The long-distance communication network 248 is also used by the locker banks server to provide data to the locker development kit 238 such as authenticators required for any request from a mobile device for establishing a communication session with the electronic locker bank as described in EP3671671 or such as a configuration package at the request of a low-level operation function for updating the operational configuration of the locker development kit. The operational configuration allows for optimizing the operation of the first mobile device with the electronic locker bank. The configuration package includes for example parameters for setting the short-distance communication network operation. The parameters of the operational configuration need to be tuned according to the local environment of the electronic locker bank and need to be regularly updated as the first mobile device and the electronic locker bank operation is improved or adapted. The configuration package may also be prepared on a server separate from the locker banks server and downloaded from that server onto the first mobile device.

The Locker banks server 246 communicates with an information system 260 of the service provider via a long-distance communication network. The information system includes a logistics management module for handling shipments or articles delivery and collection. Via a long-distance communication interface 266, the information system can provide logistics information to the Locker banks server such as with an announcement of the shipments or articles, which should be deposited in the electronic locker bank. Also, the Locker banks server can provide the information system with locker information for tracking shipments or articles deposited in or to be collected from the electronic locker bank. The information system also communicates with the first mobile device via a long-distance communication network 268 to provide information relative to the service offered by user mobile application 230.

The electronic locker bank can be used by a carrier for depositing shipments which are then picked-up by recipients of these shipments, or by a retailer for depositing articles purchased by their customers. In the case of a carrier usage, a carrier agent is provided with a first mobile device 204, which the carrier agent can use for depositing shipments in or collecting shipments from the electronic locker bank. A carrier mobile application 230, integrating the Locker Bank Toolbox, has been installed on the first mobile device. In a particular embodiment, when the carrier agent initiates a process or function of the carrier mobile application for interacting with the electronic locker bank, his credentials need to be provided to a login high-level method, which calls a low-level authentication function for authenticating the carrier agent. The low-level authentication function provides the credentials to the Locker banks server and requests an authentication. Following on a successful authentication, the carrier agent can then interact with the electronic locker bank with his first mobile device. The announcement of shipments, which are to be deposited in the electronic locker bank, provided by carrier information system 260 to the Locker banks server can then be transferred to the first mobile device by the Locker banks server via a long-distance communication network 248. Data provided with the announcement are then handled by the locker development kit for performing a deposit process according to the user mobile application installed on the first mobile device and for guiding the carrier agent.

In the case of a retailer usage, a customer of a retailer, using and generally owning the first mobile device, is provided with a retailer user mobile application 230 integrating the Locker Bank Toolbox. The retailer offers this user mobile application to his customer for ordering on-line, displaying offers, proposing advice or fidelity schemes, referring to past orders or tracking purchased articles. The retailer information system 260 exchanges data with the retailer user mobile application regarding offers from the service provider or past orders from the customer. The retailer information system 260 also announces to the locker banks server 246 the deposit of articles to be picked-up by customers of the retailer. Once an article has been deposited in the electronic locker bank 202 by a retailer agent, data relative to the deposit are sent by the Locker development kit to the Locker banks server, which are then sent to the retailer information system. Then, a notification can be sent to the customer of the retailer by the Locker banks server or by the retailer information system, alerting the customer that his article can be pick-up in the electronic locker bank and providing him with an access code.

When a user only needs to have access to the electronic locker bank independently from other services, a dedicated locker bank application 270 can be installed on the second mobile device 208. The locker bank application is developed and provided by the locker banks provider and is generally downloaded onto the second mobile device from an app store. The locker bank application can be started when the user needs to interact with the electronic locker bank and comprises a set of MMI screens 272 allowing the user to navigate the application and to access the services he needs. The locker bank application also includes a Locker development kit 274 comprising low-level operation functions and components 276, such as functions for opening compartment doors or for managing data regarding shipments/articles or compartments status or components for reading door status or lock status, which are called from the MMI screens for operating the electronic locker bank. The Locker development kit also comprises a short-distance communication module 278 for the second mobile device to communicate wirelessly with the electronic locker bank via the short-distance communication network 210 and a long-distance communication module 280 for the second mobile device to communicate with the locker banks server via the long-distance communication network 282. A tracing module 284 can also be integrated in the locker bank application for capturing logs and other information to better understand the service provider processes and to be able to perform error analysis. The tracing module 284 operates similarly to the tracing module 250 as described above. In particular, the tracing module 284 transfers data, which it has collected, to a data tracing server 252, via a long-distance communication network 286, which may be the same as the long-distance communication network 282. The tracing module, as well as the mobile application and the Locker Bank Toolbox or the locker development kit are loaded in a volatile active memory 253 of the first mobile device or in a volatile active memory 283 of the second mobile device when they are running on the corresponding mobile device.

In the case of a carrier usage, the second mobile device 208 can be used by the recipient of a shipment deposited by a carrier agent in the electronic locker bank. During the shipment deposit by the carrier agent in the electronic locker bank, deposit information is uploaded from the first mobile device of the carrier agent to the Locker banks server, and the recipient can be notified of the deposit by the Locker banks server or by the carrier information system. In the case of a retailer usage, a retailer agent is provided with a second mobile device 208, which the retailer agent can use for depositing articles ordered by customers of the retailer in the electronic locker bank or eventually for collecting articles, which have not been picked-up from the electronic locker bank. The second mobile device integrates a locker bank application 270 provided by the locker banks provider to the retailer for the retailer agent to be able to interact with the electronic locker bank. Following on an announcement of articles, which are to be deposited in the electronic locker bank, provided by retailer information system 260 to the Locker banks server, the announcement is transferred by the Locker banks server to the first mobile device via the long-distance communication network 282. Data provided with the announcement are then handled by the locker development kit 274 integrated in the locker bank application. Then, following on the deposit of articles by a retailer agent in the electronic locker bank or eventually following on the deposit on the collection of articles, which have not been picked-up from the electronic locker bank, by a retailer agent, deposit or collection events are uploaded by the locker bank application to the Locker banks server via the long-distance communication network 282.

In a particular embodiment, the second mobile device 208 integrating a locker bank application 270 also can be used by the recipient of a shipment for returning the shipment or by a shipper who needs to send an article that he has for example sold on-line to a buyer. For these particular usages, the locker bank application 270 incudes corresponding MMI screens and elements for returning shipments or sending articles, so they can be dropped off in the electronic locker bank and then collected by a carrier agent.

However, if the interaction with the electronic locker bank needs to be integrated within an application offering other services than those offered by the locker banks provider—for example within a recipient application developed by a carrier for a recipient mobile device for shipment pick-up or shipment return, within a shipper application developed by a carrier for a shipper mobile device for sending shipments, or within a retailer application developed by a retailer for a retailer agent mobile device for article deposit or article collection-then the Locker Bank Toolbox needs to be used and integrated in this application offering other services.

It is most advantageous that the locker bank toolbox and the high-level methods pack and the locker bank application and the locker development kit be conceived and developed so that a same locker development kit can be integrated in the locker bank toolbox and in the locker bank application, and then used for any application requiring interacting with the electronic locker bank including within a carrier application developed by a carrier for a carrier agent mobile device for shipments deposit or shipments collection, within a recipient application developed by the locker banks provider or by a carrier for a recipient mobile device for shipment pick-up or shipment return, within a shipper application developed by the locker banks provider or by a carrier for a shipper mobile device for sending shipments, within the retailer customer application developed by a retailer for a customer mobile device for article pick-up or article return, or within a retailer application developed by the locker banks provider or by a retailer for a retailer agent mobile device for article deposit or article collection.

To facilitate the integration of the Locker Bank Toolbox or the locker development kit into any user mobile application, the preferred solution is to develop the Locker Bank Toolbox and the locker development kit in a native software language. Currently, only a code developed in a native language of a mobile platform can be compiled with a user code developed in any kind of language and used on the mobile platform. To address the two main mobile platforms iOS and Android, the Locker Bank Toolbox and the locker development kit need to be developed in two versions: a version developed in the SWIFT language for the iOS platform and a version in the KOTLIN language for the Android platform. The Locker Bank Toolbox source code or the locker development kit source code, developed in the native language of a particular mobile platform is compiled and provided by the locker banks provider as a pre-compiled binary file to the service provider, who can compile it within his mobile application and distribute the resulting compiled file for use on the particular mobile platform.

FIG. 2 illustrates a locker bank system architecture of the invention without direct long-distance communication connection between the electronic locker bank 202 and the remote Locker banks server 246, and no data is directly exchanged between the electronic locker bank and the remote Locker banks server. Data exchange between the electronic locker bank and the remote Locker banks server is performed via the mobile devices. In another embodiment, data exchange between the electronic locker bank and the remote Locker banks server can also be performed via a long-distance communication network, which can be the same as the long-distance communication network 268 or 282, and data exchanged between the electronic locker bank and the remote Locker banks server via the mobile devices according to FIG. 2, can then be exchanged directly between the electronic locker bank and the remote Locker banks server.

Figure 3:
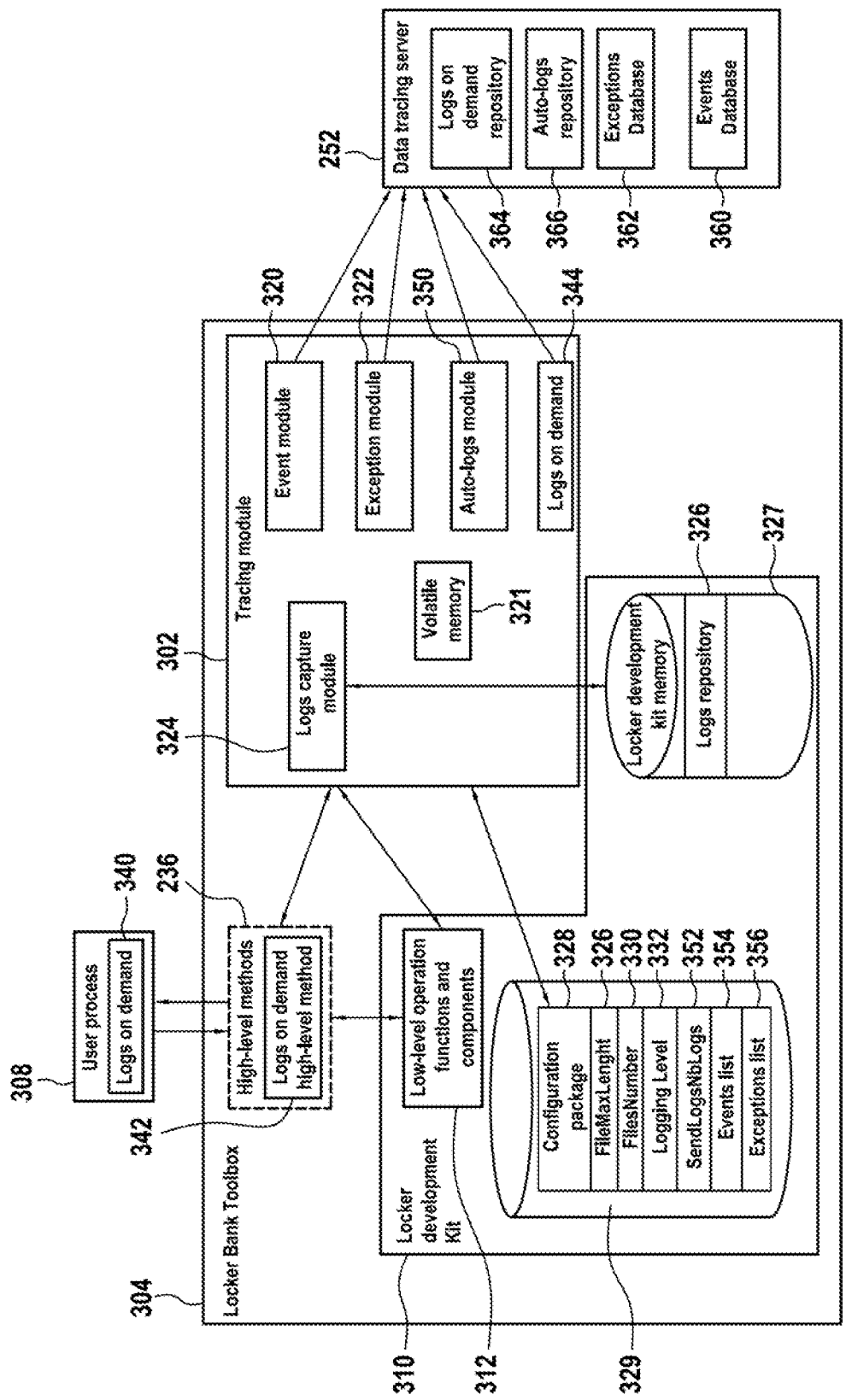
FIG. 3 shows a tracing module and a data tracing server integrated with a locker development kit embodying the present invention.

FIG. 3 illustrates an embodiment of a tracing module 302 integrated in a Locker Bank Toolbox 304 and of the data tracing server 306. The Locker Bank Toolbox can be integrated in a mobile application, which includes a user process 308, and which is run on a user mobile device. The Locker Bank Toolbox includes a set of high-level methods integrated in the high-level methods pack 236 and that the user process can call. The Locker Bank Toolbox also includes the locker development kit 310 comprising the low-level functions and components 312, which are used by the high-level methods. As seen previously, in the case of the second mobile device 208, the locker development kit can also be integrated directly into a mobile application such as a locker bank application, without being packaged into a Locker Bank Toolbox and without any intermediary high-level methods pack. The user process then can directly call the low-level functions and components of the locker development kit.

When high-level methods or low-level functions and components, or only low-level functions and components in the case of the second mobile device 208, are run following on a request from the user process, events are generated as defined by the locker banks provider. The generation of an event can for example be associated or coded with any element of code of the Locker Bank Toolbox or of the locker development kit in the case of the second mobile device 208 and can be triggered each time the element of code is run. For example, an event can be generated when a particular operation of the electronic locker bank is performed by the locker development kit such as opening a compartment or can be generated based on a message from the electronic locker bank, which is interpreted by the locker development kit such as an error code. The tracing module 302 comprises an event module 320, which collects any event and stores it temporarily in a volatile memory 321 of the tracing module. Each time the event module collects an event, the event module then packages the event for transferring the event via a long-distance communication network and sends the packaged event to the data tracing server 232 via the long-distance communication network 251 or 286. Each event comprises parametric data, which characterize the event. Parametric data include a date and hour of the event, unique session identifications, a result of the event or of an action—typically in the form of a success or error Boolean, a result code (in particular if there is an error), a duration of the action corresponding to the event, and a variety of data such as a parcel number of the parcel deposited in the electronic lockers bank or a compartment size. The unique session identifications include an application session identification, a development kit session identification and a locker session identification. A new application session identification is generated when the mobile application loads the locker development kit in the active memory 253 of the mobile device. Such loading may occur when the mobile application is started by the user or later during a specific process of the mobile application. A new development kit session identification is generated each time the mobile application performs a login for accessing functionalities of the locker development kit or of the Locker Bank Toolbox, typically for interacting with an electronic locker bank. A new server session identification is generated for each communication exchange between the mobile application and locker banks server performed via the long-distance communication network. These session identifications allow for a more efficient tracing of the operations related to the locker development kit.

While high-level methods or low-level functions and components, or only low-level functions and components in the case of the second mobile device 208, are run, exceptions may be generated when unexpected errors or behaviours occur. The tracing module 302 comprises an exception module 322, which collects exception information, stores it temporarily in the volatile memory 321 of the tracing module, packages it for transfer via a long-distance communication network, and then sends the packaged exception information to the data tracing server 232 via the long-distance communication network 251 or 286. The exception information includes a tracing thread (or stack trace) listing a succession of actions associated with or leading to the exception and an exception naming related to the latest of the succession of actions.

While high-level methods or low-level functions and components, or only low-level functions and components in the case of the second mobile device 208, are run, logs are generated as defined by the locker banks provider. The tracing module comprises a logs capture module 324, which continuously collects logs and their associated description, and chronologically stores them with an associated time and date in a logs repository 326 included in a non-volatile locker development kit memory 327 associated with or comprised in the locker development kit. The logs can cover all actions performed by the Locker Bank Tool or by the locker development kit, all messages, and in particular error messages, received from the electronic locker bank, all messages, and in particular error messages, relative to short-distance or long-distance communication, and all messages, and in particular error messages, received from the data tracing server or from the locker banks server. The logs may also include some logs transmitted from the user mobile application 230 or from the user process to the locker development kit if so desired by or so agreed with the service provider. The logs are formatted into successive unitary files of a pre-defined size constituted of a pre-defined number of bytes. A FileMaxLength parameter 326 defining this pre-defined number of bytes is included in a configuration package 328, which is stored in a memory 329 comprised in or associated with the locker development kit. Preferably, FileMaxLength equals 512 k. The logs capture module formats the captured logs into successive unitary files of FileMaxLength bytes based on the FileMaxLength parameter stored in the configuration package.

As the purpose of the logs is to provide the capability for analysing all actions performed by the Locker Bank Tool or by the locker development kit, logs can cover all details of code execution resulting in a production of a large volume of logs. Two principles associated with two parameters are used for limiting the volume of logs and the corresponding usage of memory in the mobile device. The first principle is that the number of unitary files is limited to a maximum number defined as a FilesNumber parameter 330 included in the configuration package 328. Once the logs capture module has stored FilesNumber files into the logs repository, the logs capture module starts rewriting the unitary file of the newly captured logs onto the oldest unitary file and continues looping back and chronologically overwriting onto the previous unitary files. Thus, the FilesNumber parameter corresponds to a duration of logs capturing. Preferably, FilesNumber equals the number 420 so that the transfer of the logs to the data tracing server during a logs on demand process does not block other operations of the controller of the mobile device for too long.

The second principle is to filter within the different types of logs for limiting the volume of captured logs according to a logging level 332 included in the configuration package 3289. The logs capture module selects the logs according to the logging level as follows: for a logging level equalling zero (0), no logs are captured—for a logging level equalling one (1), logs are limited to exceptions—for a logging level equalling two (2), logs includes in addition high level program level logs (associated for example with system configuration, MAC addresses, or compartment status)—for a logging level equalling three (3), logs includes in addition user level logs (associated for example with user interface actions and all actions regarding usability of the application)—for a logging level equalling four (4), logs includes in addition all user detailed information, typically corresponding to user interactions and comprising in particular all high level methods—for a logging level equalling five (5), logs includes in addition traces of all the functions used within the locker development kit—for a logging level equalling six (6), all logs are included including operating system information. In an embodiment of the invention, each log element, which can be collected by the logs capture module, is associated with level tag indicating the logging category of the log element. The logs capture module does the storing or not of the log element based on the comparison of the level tag with the logging level 332. The log element is stored if the logging level is equal of larger than the level tag associated with the log element. In another embodiment, a logs level table stored in the configuration package maps the various log elements for the locker development kit or the Locker Bank Toolbox according to the logging categories described above. The logs capture module uses the logs level table to perform the comparison with the logging level 332 and decide on the storing or not of a log element. By decreasing the value of the logging level, and therefore deceasing the flow of logs captured by the logs capture module, the duration of logs capturing is increased providing a deeper historical tracing of the locker development kit or of the high-level methods pack operation. However, detailed logs may be required, eventually requiring the setting of a logging level equalling six (6), for example when a new software version of a locker development kit or of a Locker Bank Toolbox is installed on the mobile device.

As opposed to events and exceptions, which are transferred in real time to the data tracing server, logs are continuously collected by the logs capture module within the mobile device but their transfer to the data tracing server is delayed until triggered according to two processes called logs on demand or auto-logs. The logs on demand process is used when a user encounters a problem while interacting with an electronic locker bank with his mobile device. The user can then decide to send the logs collected on his mobile phone to the data tracing server, where the logs can be accessed by a technician of the locker banks provider for analysing the problem. The user may also be requested by the locker banks provider to use the logs on demand process for sending the logs to the data tracing server for analysing the problem or any particular issue. The user initiates the logs on demand process on his mobile device interface, for example by selecting a logs on demand function 340, resulting in a call of a logs on demand high-level method 342 of the Locker Bank Toolbox. The initiation of the logs on demand process activates a logs on demand module 344 comprised in the tracing module, and the logs collected in the logs repository 326 are packaged by the logs on demand module into a file with some additional reference information including a file name, a unique ID identifying the file, a date and hour, a version of the locker development kit or of the Locker Bank Toolbox, an identification of the type of the mobile device, an identification of the service provider and a unique identification of the mobile device, to be sent to the data tracing server. Preferably, the file is in a ZIP format. The FilesNumber parameter, which limits the volume of the logs in the logs repository 326, is set for allowing a smooth transfer of the logs during a logs on demand process from the mobile device to the data tracing server.

So as to not depend only on voluntary manual actions of users for receiving logs in the data tracing server and to have in the data tracing server a minimum volume of logs continuously collected from all mobile devices, an auto-logs module 350 performs automated regular preparations of selected logs for transfer to the data tracing server. In order to ensure for a smooth transfer of logs to the data tracing server by the auto-logs module and to not overload the controller of the mobile device, the size of an auto-logs file sent to the data tracing server is limited by the parameter SendLogsNbLogs 352 stored in the configuration table corresponding to the number of unitary files packaged into the auto-logs file. The sending of auto-logs is triggered by the occurrence of an event or of an exception. Then, the auto-logs module retrieves a limited number SendLogsNbLogs of the latest unitary files collected in the logs repository, which include logs related to the triggering event or to the triggering exception, and packages these unitary files into a file also including an identification of the triggering event and/or a description of the triggering event or an identification of the triggering exception and/or a description of the triggering exception and preferably some additional reference information. The additional reference information can include a file name, a unique ID identifying the file, a date and hour, a version of the locker development kit or of the Locker Bank Toolbox, an identification of the type of the mobile device, an identification of the service provider and a unique identification of the mobile device, to be sent to the data tracing server. In order to limit the number of auto-logs transmissions and focus on the most appropriate events or exceptions, triggering events are limited to an Events List 354 stored in the configuration package 328 and triggering exceptions are limited to an Exceptions List 356 stored in the configuration package 328. Auto-logs are generally triggered by events associated with an error and may depend on the particular error. However, as the durations of actions are often measured, a successful event may also trigger auto-logs if the measured duration of the action associated with the successful event is deemed too long. For some embodiments of the invention, there may be different SendLogsNbLogs numbers for auto-logs triggered by events or for auto-logs triggered by exceptions.

The configuration package 328 can be downloaded from the locker banks server onto a first mobile device or onto a second mobile device. Thus, a different and specifically adapted configuration package can be downloaded depending on the country, on the service provider or even eventually on the mobile device user. Configuration packages can also be updated for example to increase the logging level value and provide more detailed logs when a new software version of a locker development kit or of a Locker Bank Toolbox is installed on a mobile device, and later to decrease the logging level value and provide a longer duration of logs capturing once the new software version is fully validated. Updating the logs level table included in the configuration package allows for adapting the logs filtering and better target the logs usage. The Event List or the Exception List of the configuration packages may also be updated for example depending on the type of a mobile device or on the configuration of the mobile device, which may result in particular behaviours.

Data collected by the tracing module in the form of events, exceptions or logs are transferred by the tracing module to the data tracing server 252. Events transferred by the event module are stored in an events structured memory 360, such as a database. Events can be accessed by authorized users for statistical analysis and for reporting. Automated queries can be defined for preparing dashboards for example regarding the number of parcels loaded every day, eventually depending on other parameters such as the carrier or electronic locker banks specificities or environment, or for example regarding the average login duration for interacting with the electronic locker bank for agents of a service provider. Exceptions transferred by the exception module are stored in an exceptions structured memory 362, such as a database. Events can be accessed for statistical analysis and for reporting by authorized users, typically by personnel of the locker banks provider. Automated queries can be defined for preparing dashboards for example on the number of each exception type, eventually depending on other parameters such as mobile types or software versions or countries, so as to focus on the most frequent exceptions. These two structured memories 360 and 362 can be used for monitoring the mobile devices and their interactions with the electronic locker banks resulting eventually in requests for logs on demand capture and upload for detailed analysis of potential issues. The locker banks provider may request for a logs on demand process with a particular a mobile device user for him to upload to the data tracing server the logs collected on his mobile phone or may initiate a broader logs campaign involving a group of users. Logs transferred by the logs on demand module are stored in a logs on demand repository 364 and can be used by personnel of the locker banks provider for analysing problems. In an embodiment, unitary files of the logs are simply chronologically stored in the logs on demand repository and can be simple zipped files. Tags identifying the type of the mobile device or even identifying each mobile device can structure the inventory and help for analysing issues specific to a mobile device. The inventory can also be structured in sub-directories according for example to the following tree structure: environment corresponding to a country or a production environment (development, qualification, stagging . . . )—service provider—year-month-day. The tree structure can be established based on the reference information associated with the logs file transferred by the mobile device to the data tracing server. Auto-logs transferred by the auto-logs module are stored in an auto-logs repository 366. Unitary files of the auto-logs can also be simply chronologically stored in the repository and can be tagged or organized in tree structure similarly to the logs on demand repository. Regularly, unitary files can be suppressed from the logs on demand repository and from the auto-logs repository, for example 30 days after being stored in the repositories, in order to free memory space in the data tracing server. In an embodiment, logs and auto-logs can be stored in the same repository.

Figure 4:
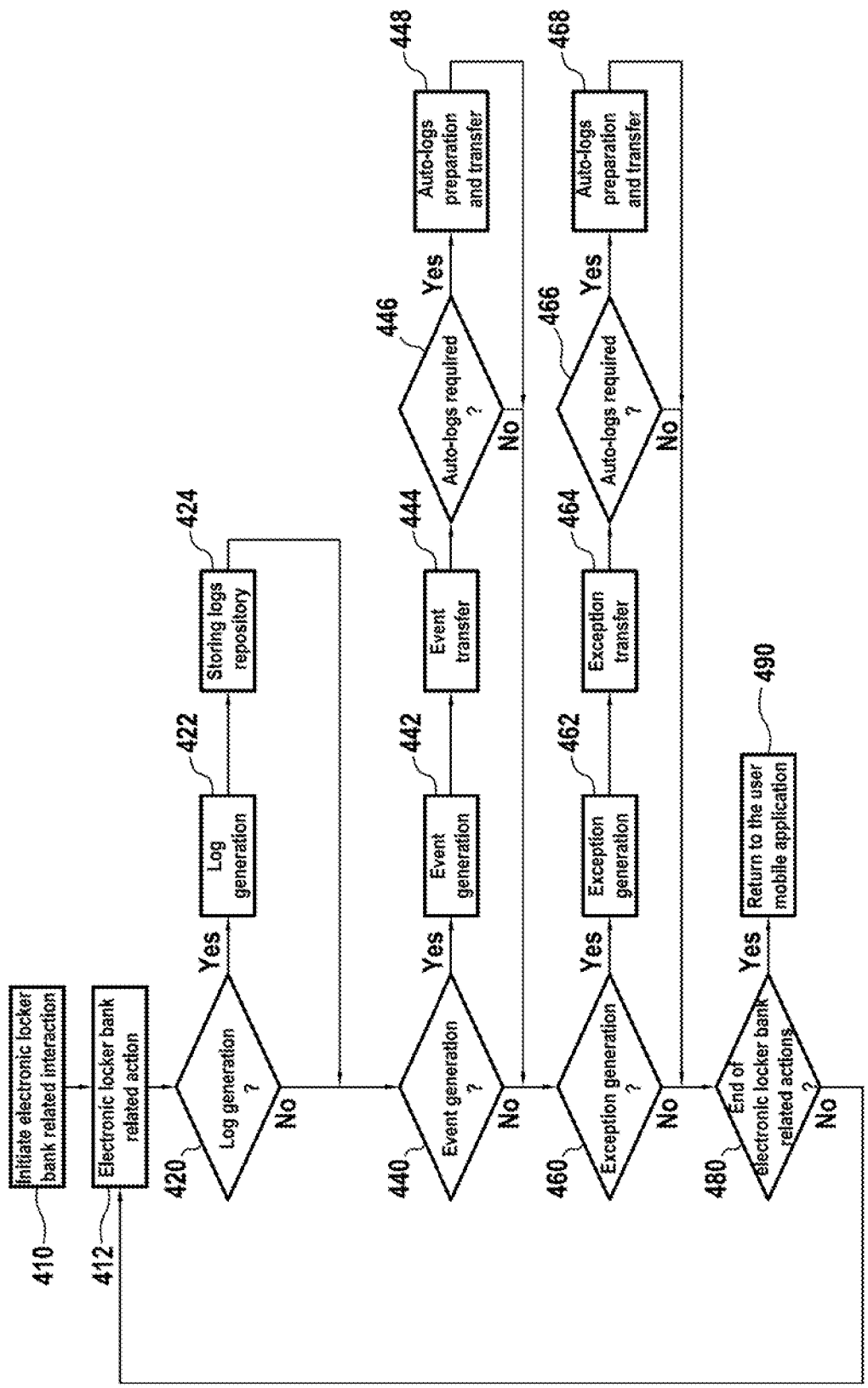
FIG. 4 represents a flow diagram of a method using a tracing module and a data tracing server according to an embodiment of the invention.

A method using the tracing module 302 and the data tracing server 252 according to the invention is now described in reference to FIG. 4. The tracing module is integrated in a user mobile application running on a mobile device in parallel or within the locking development kit 310. When a process of the user mobile application requires an interaction with the electronic locker bank, for example for depositing or removing a parcel from the electronic locker bank, or an interaction related to the electronic locker bank, for example for transferring logs on demand to the data tracing server, in act 410, the user mobile application initiates an electronic locker bank related interaction corresponding to a series of actions performed by the locker development kit or by the tracing module or eventually by the high-level methods pack 236 in the case of the user mobile application being used in the first mobile device 204 (for example of a carrier agent). For each successive action 412 related to the electronic locker bank performed within this series of actions, any of the following tracings may be triggered: log tracing, event tracing or exception tracing. In act 420, if the action does not require any log to be generated, act 440 takes place. Otherwise, in act 422, if the action requires a log to be generated, and in particular based on the logging level 332, a log associated with the action and including a description related to the action and time and date of the action is generated. In act 424, the log is stored in a logs repository included in the non-volatile locker development kit memory 327 associated with or comprised in the locker development kit in accordance with the format of the logs repository. The logs repository is composed of successive unitary files with a pre-defined maximum number of bytes (FileMaxLength parameter 326). If the number of unitary files stored into the logs repository has reached the maximum number FilesNumber 330, the logs capture module starts overwriting the oldest unitary files with the remaining unitary files of the newly captured log. In act 440, if the action does not require any event to be generated, act 460 takes place. Otherwise, if the action requires an event to be generated, then an event related to the action and including parametric data characterizing the event is generated in act 442. The event data is packaged and formatted for being communicated to the data tracing server and is transferred via a long-distance communication network to the data tracing server in act 444. If the event related to the action does not require the triggering of an auto-logs, i.e. if the event related to the action is checked as not included in the Events List 354, in act 446, act 460 takes place. Otherwise, if the event related to the action is checked as included in the Events List, then a limited number SendLogsNbLogs of the latest unitary files collected in the logs repository is retrieved and packaged with the triggering event identification and description, and the resulting package is transferred via the long-distance communication network to the data tracing server in act 448. In act 460, if the action does not result in an exception generation, act 480 takes place. Otherwise, if the action causes an exception, then an exception related to the action and including a description characterizing the exception and an exception code is generated in act 462. The exception data is packaged and formatted for being communicated to the data tracing server and is transferred via a long-distance communication network to the data tracing server in act 464. If the exception related to the action does not require the triggering of an auto-logs, i.e. if the exception related to the action is checked as not included in the Exceptions List 356, in act 466, act 480 takes place. Otherwise, if the exception related to the action is checked as included in the Exceptions List, then a limited number SendLogsNbLogs of the latest unitary files collected in the logs repository is retrieved and packaged with the triggering exception code and description, and the resulting package is transferred via the long-distance communication network to the data tracing server in act 468. The number SendLogsNbLogs may be different for events and for exceptions. In act 480, if no more action related to the electronic locker bank is required, the process of the user mobile application, which initiated the electronic locker bank related interaction, resumes in act 490. Otherwise, the next electronic locker bank related action takes place in act 412.

Figure 5:
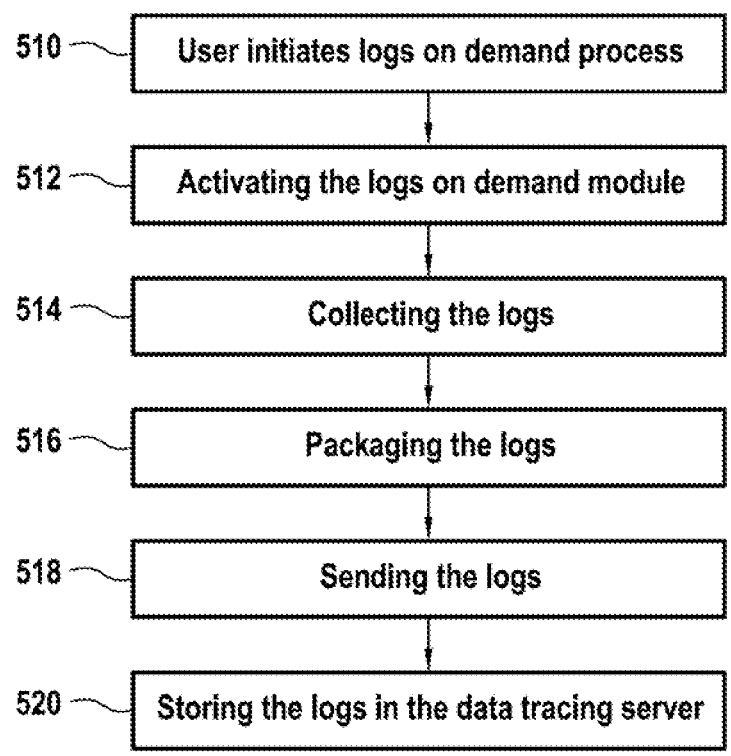
FIG. 5 illustrates a method for logs on demand according to the invention according to an embodiment of the invention.

A method for logs on demand according to the invention is now described in reference to FIG. 5. When a user, generally a carrier agent, encounters a problem while interacting with an electronic locker bank with his mobile device, he can contact a customer service department of the locker banks provider, for example he can call a hot line. The customer service department may then open a problem ticket and request the user to upload the logs from his mobile device to the data tracing server, where the logs can be accessed by a technician of the locker banks provider for analysing the problem. On other occasions, a user may also be requested by the locker banks provider to upload the logs to the data tracing server for analysing any particular issue, which may be based on a monitoring of the mobile devices and their interactions with the electronic locker banks and for example based on the data, the dashboards and reports accessible on the data tracing server 252. In act 510, the user initiates the logs on demand process on the interface of his mobile device, for example by selecting the logs on demand function 340. The mobile device interface can for example provide a button for selecting the logs on demand function. In act 512, in an embodiment of the invention where a Locker Bank Toolbox is integrated in the mobile application, typically in a carrier usage case, the selection the logs on demand function results in a call of the logs on demand high-level method 342 of the Locker Bank Toolbox 304, and the logs on demand high-level method activates the logs on demand module 344 comprised in the tracing module 302. In another embodiment of the invention, a dedicated locker bank application 270 is installed on the mobile device of the user and includes the locker development kit 310. The selection the logs on demand function results in an activation of the logs on demand module, either directly or via the locker development kit. In act 514, all the logs stored in the logs repository 326 and composed of successive unitary files with a pre-defined maximum number of bytes are collected by the logs on demand module from the logs repository. In act 516, the collected logs into a file are packaged by the logs on demand module into a file, including a file name, a unique ID identifying the file, a date and hour, a version of the locker development kit or of the Locker Bank Toolbox, an identification of the type of the mobile device, an identification of the service provider and a unique identification of the mobile device. In act 518, the packaged file is transferred by the logs on demand module from the mobile device to the data tracing server. In act 520, the transferred packaged logs are stored in the logs on demand repository 364 of the data tracing server. The unitary files of the logs are simply chronologically stored in the logs on demand repository and are added to previously stored logs. Logs stored in the logs on demand repository can be accessed by personnel of the locker banks provider for analysing problems regarding interaction of mobile devices with electronic locker banks. Preferably, the opened problem ticket is completed with the unique ID identifying the file, the date and hour, and the identification of the service provider.

A locker bank system for an item deposit and collection comprising: an electronic locker bank integrating a controller system configured to manage a compartment equipped with an electronically controlled door for securing a temporary storage of the item and communicating with a mobile device via a short-distance communication network, and a locker banks server communicating with the mobile device via a long-distance communication network, characterized in that the mobile device comprises a mobile application integrating a locker development kit packaging required components for allowing for the mobile device to interact with the electronic locker bank and a tracing module configured for capturing logs, an event, or an exception and for transferring the logs, the event or the exception via a long-distance communication network to a data tracing server in order to better understand processes of a service provider owning the mobile device and application and to be able to perform error analysis regarding interactions with the electronic locker bank. Logs are continuously collected by the tracing module and are transferred to the data tracing server and chronologically compiled. This compilation is used for analysing problems reported by users or problems identified based on the events reporting or the exceptions reporting.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via one or more computers, processor-based systems, and/or processors (e.g., microprocessors, microcontrollers, central processing units (CPUs), digital signal processors (DSPs), graphics processing units (GPUs), application specific integrated circuits (ASICs), field programmable gate arrays (FPGA), along with nontransitory storage media (e.g., non-volatile memory, volatile memory, read only memory (ROM), random access memory (RAM), FLASH memory, EEPROM, registers, magnetic disk drives, optical disk drives, solid state drives), and/or communications subsystems (e.g., radios, transmitters, receivers and associated antennas, wired and/or optical communications ports and associated drivers or modems). Those skilled in the art will recognize that the parcel locker banks can include one or more processors, nontransitory storage media, communications subsystems. Those skilled in the art will recognize that the parcel locker banks can include one or more actuators (e.g., electric motor, solenoid, pneumatic or hydraulic cylinder, piston and valves, electromagnets, latches and/or locks, which are operable to unlock and/or open a parcel locker door and/or lock or close a parcel locker door of a parcel locker bank, for example in response to signals from the processor(s). Those skilled in the art will recognize that the parcel locker banks, and even individual parcel lockers can include one or more, sensors (e.g., sensor to detect state or position of a door, sensor to detect when locker compartment is occupied or emptied), for example a PIR sensor, a weight sensor or load cell, a Reed switch, a contact sensor or switch, position sensor, pressure sensor, temperature sensor, force sensor, IR transmitter receiver pair, etc. The sensors can be communicatively coupled to the one or more processors to provide information or data thereto, which the processor(s) can use to control operation of the parcel locker bank, parcel lockers, or interact with servers and/or with mobile communications devices (e.g., users smartphones or tablet computers). Those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

The invention claimed is:

1. A locker bank system for an item deposit and collection comprising:

an electronic locker bank integrating a controller system configured to manage a compartment equipped with an electronically controlled door for securing a temporary storage of said item and communicating with a mobile device via a short-distance communication network, and a locker banks server of a locker banks provider communicating with said mobile device via a long-distance communication network, wherein said mobile device comprises a mobile application integrating a locker development kit, said locker development kit packaging a set of relatively low level components that allow said electronic locker bank to interact with and be operated by said mobile device and a tracing module that captures logs, an event, or an exception and that transfers said logs, said event or said exception via a long-distance communication network to a data tracing server, where the data is stored and accessed by the locker banks provider for analysis or for reporting, and wherein a partial access to the data tracing server is provided to a service provider for some data relevant for the service provider, wherein the service provider is a logistic application service provider or a retailer application service provider, and the mobile device comprises a service provider application including relatively high level methods, and the locker development kit is provided by the locker banks provider and comprises the set of relatively low level components that are integrable into the service provider application by the service provider.

2. The locker bank system according to claim 1, wherein said tracing module comprises an event module configured for collecting said event generated as defined by said locker banks provider and for storing said event temporarily in a volatile memory of said tracing module and for transferring said event to said data tracing server via said long-distance communication network.

3. The locker bank system according to claim 1, wherein said event comprises parametric data characterizing said event including a date and hour of said event or a result of said event or a result code or a duration of an action corresponding to said event or unique identifications of sessions when said event takes place and wherein said identifications of sessions comprise an application session identification generated when said mobile application loads said locker development kit in an active memory of the mobile device or a development kit session identification generated when said mobile application performs a login or a server session identification generated for each communication exchange between said mobile application and said locker banks server.

4. The locker bank system according to claim 1, wherein said tracing module comprises an exception module configured for collecting said exception generated when an unexpected error or behavior occurs and for storing said exception temporarily in a volatile memory of the tracing module and for transferring said exception to said data tracing server via said long-distance communication network, and wherein said exception includes a tracing thread listing a succession of actions associated said exception and an exception naming related to a latest of said succession of actions.

5. The locker bank system according to claim 1, wherein said tracing module comprises a logs capture module configured for collecting said logs generated as defined by said locker banks provider and for storing said logs chronologically with an associated time and date in a logs repository included in a non-volatile locker development kit memory and for transferring said logs to said data tracing server via said long-distance communication network.

6. The locker bank system according to claim 1, wherein said logs include logs transmitted from said mobile application to said locker development kit.

7. The locker bank system according to claim 1, wherein said logs are formatted into successive unitary files constituted of a pre-defined number of bytes comprised in a configuration package stored in a memory included in or associated with said locker development kit, and wherein said pre-defined number of bytes equals 512 k.

8. The locker bank system according to claim 5, wherein a number of unitary files stored in said logs repository is limited to a maximum number stored in said configuration package, and wherein said maximum number equals 420.

9. The locker bank system according to claim 5, wherein said logs capture module is configured for selecting said logs according to a logging level stored in said configuration package.

10. The locker bank system according to claim 1, wherein said tracing module comprises a logs on demand module configured for being activated by a user of said mobile device and for packaging into a file said logs stored in a logs repository with a reference information and for transferring said file to said data tracing server via said long-distance communication network, and wherein said reference information includes a name of said file or a unique ID identifying said file or a date and hour or a version of said locker development kit or a unique identification of said mobile device.

11. The locker bank system according to claim 1, wherein said tracing module comprises an auto-logs module configured for an occurrence of an event or of an exception to trigger a retrieving of a number SendLogsNbLogs of latest unitary files stored in a logs repository and a transferring of the retrieved latest unitary files to said data tracing server via said long-distance communication network.

12. The locker bank system according to claim 11, wherein said triggering event is comprised in an Events List stored in said configuration package and said triggering is comprised in an Exceptions List stored in said configuration package, and wherein said SendLogsNbLogs is stored in said configuration package.

13. The locker bank system according to claim 7, wherein said configuration package is downloaded from said locker banks server onto said mobile device.

14. The locker bank system according to claim 11, wherein said data tracing server comprises an events structured memory for storing events transferred by said event module and an exceptions structured memory for storing events transferred by said exception module and a logs on demand repository for storing logs transferred by said logs on demand module and an auto-logs repository for storing logs transferred by said auto-logs module.

15. The locker bank system according to claim 14 wherein said logs on demand repository or said auto-logs repository is configured for storing chronologically unitary files transferred from said tracing module, wherein unitary files stored in said logs on demand repository or in said auto-logs repository are regularly suppressed and wherein said logs on demand repository and said auto-logs repository are part of a common repository.

16. The locker bank system according to claim 1, wherein it further comprises a Locker Bank Toolbox including a high-level methods pack configured to be called by said mobile application and including said tracing module and wherein said locker development kit is configured to be called by high-level methods of said high-level methods pack for allowing interaction with said electronic locker bank.

17. A method for operating the locker bank system according to claim 1 including:
    initiating an electronic locker bank related interaction corresponding to a series of actions performed by said locker development kit, and
    for each action within said series of actions:
    generating logs associated with said action and including a description related to said each action and time and date of said each action,
    storing said log in a logs repository,
    if said action requires an event to be generated:
    generating an event related to said action and including parametric data characterizing said event,
    packaging said event for being communicated to said data tracing server and transferring said event to said data tracing server,
    if said action requires an exception to be generated:
    generating an exception related to said action and including a description characterizing said exception and a code for said exception, and
    packaging said exception for being communicated to said data tracing server and transferring said event to said data tracing server.

18. The method according to claim 17, wherein said generating a log and said storing said log occur if said action requires a log to be generated based on a logging level (332).

19. The method according to claim 17, wherein said storing said log in a logs repository further comprises:
    reaching a maximum number of unitary files stored in said logs repository, and
    overwriting oldest unitary files stored in said logs repository with unitary files of said logs,
    wherein said event is checked as included in an Events List and said transferring said event further comprises:
    retrieving a first number SendLogsNbLogs of latest unitary files stored in said logs repository,
    packaging said first number SendLogsNbLogs of latest unitary files with an identification and a description of said event into a first transferable package, and
    transferring said first transferable package to said data tracing server, and
    wherein said exception is checked as included in an Exceptions List and said transferring said exception further comprises:
    retrieving a second number SendLogsNbLogs of latest unitary files stored in said logs repository,
    packaging said second number SendLogsNbLogs of latest unitary files with said code of said exception and said description characterizing said exception into a second transferable package, and
    transferring said second transferable package to said data tracing server.

20. A method for operating the locker bank system according to claim 5 including:
    initiating a logs on demand process,
    retrieving all logs from said logs repository,
    transferring said all logs from said mobile device to said data tracing server, and
    storing said all logs in said data tracing server,
    wherein said initiating a logs on demand process is performed by selecting a function on an interface of said mobile device.

* * * * *